April 14, 1953     J. A. KANUCH     2,634,621
HYDRAULIC POWER UNIT

Filed Aug. 24, 1949     2 SHEETS—SHEET 1

Inventor:
John A. Kanuch

Inventor:
John A. Kanuch

Patented Apr. 14, 1953

2,634,621

UNITED STATES PATENT OFFICE 2,634,621

HYDRAULIC POWER UNIT

John A. Kanuch, Cleveland, Ohio, assignor to Borg-Warner Corporation, Chicago, Ill., a corporation of Illinois Application August 24, 1949, Serial No. 112,105

3 Claims. (Cl. 74—335)

This invention relates to transmissions and more particularly to a hydraulic power unit especially adapted for shifting the gears of a two-speed rear end type transmission.

It is sometimes the practice to provide a vehicle with what is termed a two-speed rear end or rear axle wherein by shifting a driving gear from engagement with one of a pair of driven gears to engagement with the other, the speed ratio may be changed. Such mechanisms have found particular application in heavy vehicles such as trucks, but are also adaptable for use with passenger automobiles and other lighter vehicles. One method of operating such mechanisms has been to utilize the vacuum of the motor of the vehicle. The objection here is that the vacuum is limited as to the amount of power which may be had, even where a booster vacuum pump is employed, and also requires a double tubing system from the control valve to the shifting mechanism, which system may break down and is difficult to repair. On the other hand, because of the distance between the driver's position, in the ordinary arrangement, and the two-speed rear end, mechanical linkage is not entirely satisfactory and does not provide the desired flexibility of control.

An object of the present invention is to provide a new and improved hydraulic power unit for a transmission and more particularly, a hydraulic power unit for shifting the gears of a two-speed rear end.

A further object of the present invention is to provide a hydraulic power unit which, while simple and compact, is capable of delivering sufficient power to provide for shifting the gears of a heavy transmission and is particularly adapted for remote control.

In accordance with one embodiment of this invention, a hydraulic power unit may comprise an intermeshing gear type pump driven from the rear axle so as to rotate at a speed proportional to the speed of the vehicle wheels, a relief valve for limiting the maximum pressure developed by said gear pump, a solenoid actuated spool valve for controlling the application of pressure to a hydraulic piston and a gear shifting mechanism including a spring which is loaded by the hydraulic piston so as to effect shifting of the gears upon torque interruption. The piston is so arranged that in either direction of movement of the piston in response to application of hydraulic pressure, it does not travel its full distance in the initial loading of the spring, but only after the torque has been interrupted does the piston move the full distance. Initial movement of the hydraulic piston leaves the main exhaust port covered so that exhaust is through a spring regulated check valve, thus maintaining constant hydraulic pressure on the spring motor until shifting has occurred. Thus, in the shifting operation, there is a combination of hydraulic and spring pressure.

Other objects and advantages of the present invention will be apparent from the following detailed description taken in conjunction with the drawings wherein.

Figure 1:
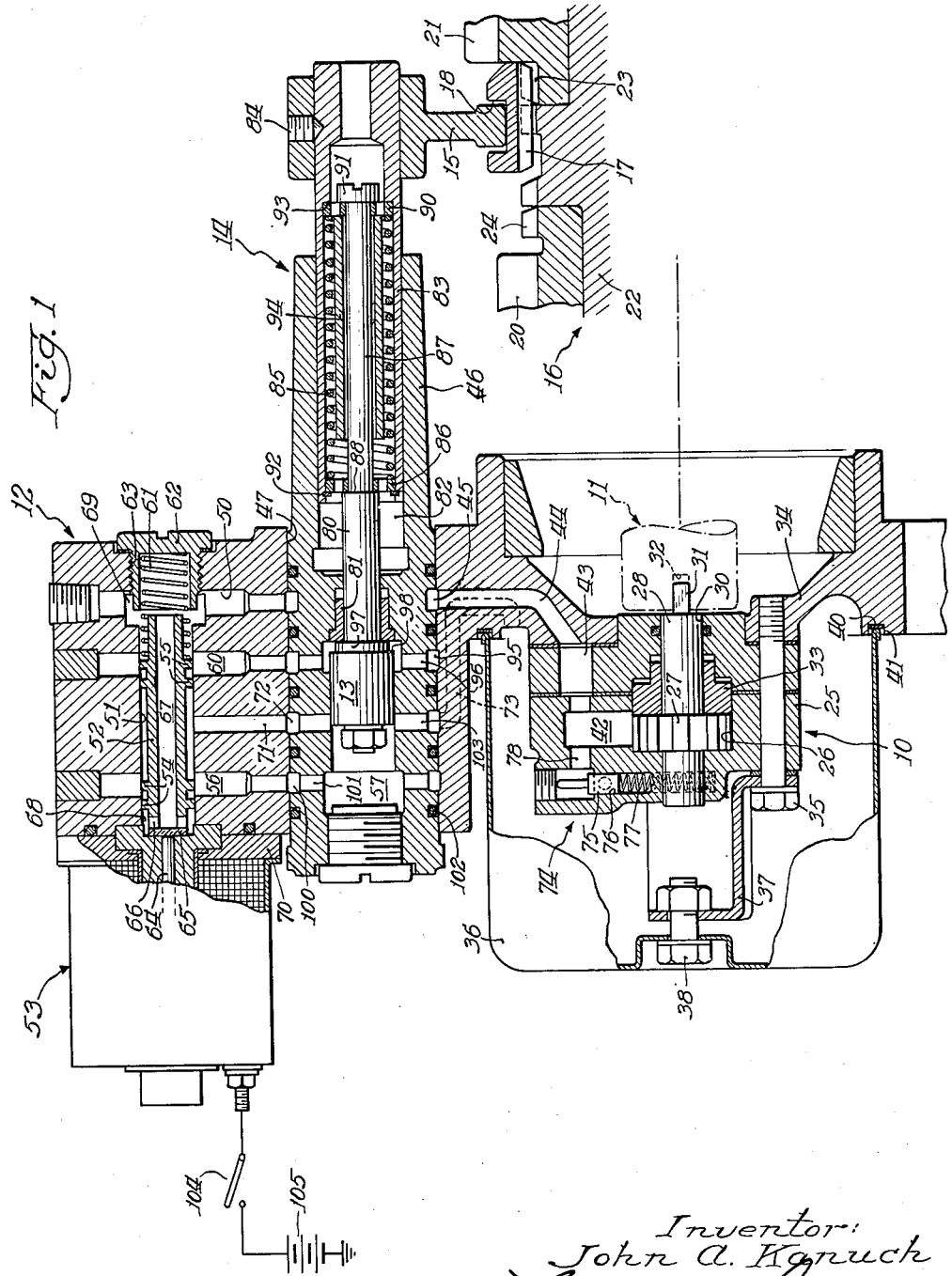
Fig. 1 is a longitudinal sectional view, of a hydraulic power unit constructed in accordance with one embodiment of this invention.

Referring now to the drawings and particularly to Fig. 1 thereof, reference numeral 10 designates a source of hydraulic pressure comprising an intermeshing gear type pump driven through a coupling 11 which may be connected in any suitable manner to the rear axle of the vehicle, whereby when the vehicle is moving and the wheels are turning, the pump will be driven. The output of the pump is applied through a two position control valve 12 to a hydraulic piston 13 having associated therewith a double acting spring assembly or motor 14 which is loaded or cocked by movement of the piston 13. Spring 14 has connected to the right end thereof a shifting fork 15 for shifting the gears of a two-speed axle transmission 16, showing fragmentarily, the fork being connected to a shiftable clutch gear 17 through an annular groove 18 formed about the periphery of the gear 17. The two-speed rear axle comprises in part the driven gears 20 and 21 which are loosely mounted on the shaft 22, to which the shiftable gear 17 is splined, and gears 20 and 21 engage axle driving gears (not shown) in conventional manner.

It will be evident from this general description that by moving the shifting fork 15 to the right, the internally toothed clutch gear 17 splined on shaft 22 will be caused to engage hub gear portion 23 of driven gear 21 in driving relation; on the other hand, movement of the shifting fork 15 to the left will cause driving gear 17 to engage hub gear 24 of driven gear 20 in driving relation. Because the gears 20 and 21 are of different sizes, different axle speed ratios may be thus established.

Referring now more particularly to the intermeshing gear pump 10, it will be seen that this includes a pump housing 25 provided with gear and bushing receiving chamber 26 in which may be located a pair of pumping gears, the gear 27 only being shown in Fig. 1. Shaft 28, fixed to and supporting pumping gear 27, extends to the right through an aperture 30 in the right end wall of pump housing 25, in which the shaft is journalled, and terminates in a key 31. Key 31 is received in a suitably slotted, transverse recess or key slot 32 formed in the left end of coupling 11 whereby the shaft 31 is keyed to the coupling 11 for rotation therewith.

Gear pump 10 may be of the pressure loaded type, in which case bushing 33, which supports gear 27 and is adapted to engage the right side thereof in pumping seal relation, is made axially movable in response to application of pressure to the pressure responsive surfaces thereof in accordance with conventional pressure loaded pump design practice as explained in detail in Roth and Lauck Patent No. 2,420,622 issued May 13, 1947. The pump housing 25 is rigidly secured to body member 34 of the power unit by suitable means such, for example, as the bolt 35. A cover 36 of generally cylindrical configuration encloses the pump housing and is supported by a bracket 37 carried by the bolt 35, nut and bolt assembly 38 at the left end of bracket 37 providing a means for securing the cover 36 tightly in position. The right end or rim of the cover 36 bears against a sealing ring 40 received in an annular groove 41 formed in the left side of body member 34 and the ring 40 is made of a resilient, rubber-like material so that the cover may be tightly sealed to the body member by suitable adjustment of nut and bolt assembly 38.

The cover 36, in addition to enclosing the gear pump 10, serves as a reservoir or sump for the system and normally would be substantially filled with oil or other hydraulic fluid.

Pump 10 discharges through a vertically extending outlet passage 42 formed in pump housing 25 which connects adjacent its upper end with a short, laterally extending passage 43 also formed in pump housing 25. The right end of lateral passage 43 connects with an upwardly extending passage 44 formed in body member 34 of the power unit, which passage, in turn, connects at its upper end with an annular passage 45 formed about the periphery of a cylinder block 46, mounted in a chamber 47, which extends through the mid-portion of housing 34, from the left to the right sides thereof, as viewed in Fig. 1. The hydraulic piston 13 is journalled in the left portion of cylinder block 46. At its upper side the annular passage 45 communicates with a further passage 50 formed in the housing 34, the upper end of passage 50 extending to and communicating with the right end of control valve chamber 51, thus providing the pressure inlet port for the valve assembly 12.

Control valve assembly 12 comprises a spool-type, shuttle valve 52 which is axially shiftable to the right in the chamber 51 by a solenoid assembly designated generally at 53 and mounted on the left side of housing 34, adjacent the spool valve chamber 51. More specifically, the shuttle valve 52 comprises a sleeve-shaped body portion having a first pair of spaced, integrally formed, peripheral ridges or flanges 54 adjacent its left end and a second pair of spaced, peripheral, annular ridges or flanges 55 integrally formed therewith adjacent its right end. The flanges 54 and 55 fit closely in the chamber 51 and the spacing between the two pairs of flanges is such that when the left pair of flanges 54 closes the entrance to a downwardly extending passage 56 leading to the left side of a piston chamber 57 formed in cylinder block 46, the second pair of flanges 55 closes a passage 60 extending parallel to passage 56 and leading to the right end of chamber 57. It will be understood that this position of the valve 52 is merely transitory and is described only by way of explanation of the spacing between the flanges, as actually the valve has only two working positions: extreme left, as shown, or extreme right.

When the solenoid 53 is not energized, or after the solenoid 53 is deenergized, shuttle valve 52 is returned to and maintained in its left position, that is, the position shown, by a helically coiled spring 61 positioned about the right end of valve 52. The body of shuttle valve 52 is made substantially less in diameter than the inner diameter of cylindrical chamber 51, permitting the spring 61 to be disposed about the periphery of the right portion of the valve. The left end of spring 61 bears against the right side of right flange 55, while the right end of the spring is received in and bears against the inner side of a hollow retaining cap 62. Retaining cap 62 is threaded into an aperture 63 formed in the right side of housing 34 and axially aligned with chamber 51. Viewed otherwise, aperture 63 might be considered an enlarged extension of chamber 51. The cap 62 is substantially larger in inside diameter than the outside diameter of the adjacent end portion of spool valve 52 and of peripherally mounted spring 61 to provide thereby, in either position of the valve 52, a path from valve inlet passage 50 to an axially extending passage 67 formed through the hollow valve 52.

In order to shift the valve 52 to the right, the solenoid assembly 53 is energized to shift solenoid plunger 64 to the right. It will be noted that an insulating disc 65 is mounted at the right end of plunger 64 and bears at its right side against the left end of spool valve 52. In order to continue the pressure path afforded through the spool valve 52 by axially extending passage 67, the left end portion of shuttle valve 52 has formed therein a plurality of deep notches 66 which extend to the right toward the flanges 54. Thus, while the disc 65 seats against the left end of valve 52, it does not close the path, and the notches 66 permit fluid delivered to the valve chamber 51, and passing through axially extending aperture 67, to reach an annular pressure chamber 68, the chamber 68 being defined by the left portion of chamber 51, the left side of left flange 54, the periphery of disc 65, the periphery of the end portion of shuttle valve 52, and the right, radially inner side of a generally cylindrical, stepped or flanged bushing 70 in which the solenoid core 64 is journalled.

From the foregoing it will be apparent that when the spool valve is shifted to its extreme right position by energization of the solenoid 53, there is provided a pressure path from the pump 10 through passage 50, passage 67 extending through valve 52, notches 66 to annular chamber 68, and from the annular chamber 68 through the downwardly extending passage 56 to the left end of piston chamber 57. On the other hand, when the spool valve is in its extreme left position, as shown in Fig. 1, then a path is provided from the passage 50 around the periphery of the right portion of the spool valve, that is, through a chamber 69 defined by the adjacent wall of chamber 51 and the right end portion of valve 52, to the passage 60 leading to the right end of piston chamber 57, the pair of flanges 55 then being positioned to the left of the entrance to passage 60. As stated hereinbefore, spring 61 normally urges the spool valve 52 into this latter position, but upon energization of solenoid 53, the spool valve 52 may be shifted to the right against spring 61 to provide the first described relation of parts.

Sump return from the control valve 12 is provided through an exhaust passage or port 71, the upper end of which communicates with chamber 51 at a point midway between passage 56 and 60, while the lower end of passage 71 communicates with an annular passage 72 formed about the periphery of cylinder block 46. As will be evident from the drawing, in no position of the valve 52 is exhaust port 71 closed; that is to say, the exhaust port is always in communication with the open center portion of the spool valve. At the lower side of the cylinder block the exhaust path continues through a passage 73 which extends through the housing 34 and connects at its lower end to the sump or reservoir defined by the interior of enclosure 36.

As hereinbefore stated, the pump 10 delivers fluid under pressure only when the axle by which it is driven is turning. However, the capacity or displacement of the pump is made such that at a very low vehicle speed, such as two to three miles per hour, the fluid pressure is adequate to operate the shifting mechanism. In order to limit the maximum output pressure of the pump 10, which would otherwise tend to become excessive as the vehicle speed increased, a relief valve assembly designated generally at 74 is provided in the pump housing 25. More specifically, the relief valve assembly comprises a spring regulated ball check valve 75 disposed in a vertically extending valve chamber 76 formed in pump housing 25. Spring 77 holds the valve 75 normally in closed position, thus preventing passage of fluid from a laterally extending chamber 78, connecting at its right end to discharge passage 42 and at its left end to the check valve chamber 76, to the sump. However, upon the resistance of spring 77 being overcome by the discharge pressure of pump 10, the check valve will open and prevent further increase of pressure. The operation of the check valve is conventional and the structure is well known to the art. For this reason, further description is believed unnecessary.

Referring now to the hydraulic piston 13 and spring motor assembly 14, it will be seen that the piston is mounted at the left of a piston shaft 80, the shaft 80 extending to the right, through a bushing 81 mounted in the cylinder block 46 at the right end of piston chamber 57, into a long chamber 82 formed in the right end portion of cylinder block 46 in which the double-acting spring assembly 14 is disposed. The double-acting spring assembly 14 comprises a sleeve 83 slidably journalled in chamber 82 and being fixed at its right end to the gear shifting fork 15 by a set screw 84 carried by the shifting fork. Sleeve 83 encloses a helically coiled spring 85, the left end of which bears against a retainer ring or collar 86 mounted about the left end of a reduced portion 87 of shaft 80, the left side of ring 86 bearing against a shoulder 88 formed at the junction of the major portion of shaft 80 and the reduced portion 87. The right end of spring 85 bears against a ring or collar 90, similar to the ring 86, and also positioned about the periphery of reduced shaft portion 87, the ring 90 being located adjacent the right end of shaft 87 and retained thereon by cap member 91. Cap 91 may be threaded into the shaft 87 and is of substantially wider diameter than this portion of the shaft. The left, inner end of sleeve 83 is annularly grooved to receive a snap ring 92, which ring prevents the spring retainer ring 86 carried by shaft 87 from moving to the left beyond the sleeve 83. The retainer ring 90 at the right end of the spring 85 is held in sleeve housing 83 by inwardly extending shoulder 93 integrally formed with the housing, as shown. Spring 85 is normally slightly compressed between the two rings.

In order to limit the initial travel of piston 13, a spacer sleeve 94 is disposed about shaft portion 87, between the periphery of the shaft and the coiled spring 85, and the length of the spacer sleeve 94 is made substantially less than the normal spacing between the retainer rings 93 and 86 and less than the full distance of travel of which piston 13 is capable, thus permitting substantial compression of the spring 85 upon the initial movement of piston 13, but at the same time limiting the maximum compression thereof. Since the difference in the length of spacer sleeve 84 and the normal distance between rings 86 and 90 is less than the distance of travel of which the piston 13 is capable, the piston 13 will load the spring during its initial movement, then stop and await torque interruption, and then upon torque interruption, permitting shiftable gear 17 to shift its position on driven shaft 22, the piston 13 will complete its travel with the spring 85. Thereafter, the spring continues to move the shifting fork a distance equivalent to the distance over which spring 85 was compressed during the initial shifting movement of the piston 13.

In the arrangement and relative position of the parts as shown in Fig. 1, discharge pressure from the pump 10 will be applied to the right side of piston 13 through the pressure path including the upwardly extending passage 50, the annular chamber 69 around the right portion of shuttle valve 52, and the downwardly extending passage 60. At its lower end downwardly extending passage 60 connects with an annular passage 95 formed about cylinder block 46, to which passage is connected a pair of oppositely extending, radial passages 96 formed in cylinder block 46 and connecting at their inner ends to the right end of pressure chamber 57. It will be noted that the right end portion of piston 13 is peripherally recessed or grooved at 97. Recess 97 is not made sufficiently deep to permit the recessed portion to slide into the bushing 81, but is made deep enough to provide a motive or pressure responsive surface 98 adjacent the right end of piston 13. Application of pressure to this motive surface 98 will tend to move piston 13 and shaft 80 to the left, thereby causing head or cap 91 at the right end of shaft portion 87 to force the ring 90 to the left against the pressure of spring 85, thus compressing the spring.

Because of the spacer sleeve 94 and the fact that the gear 17 is engaged under torque, the initial movement of piston 13 is limited, and the piston 13, while urged to the left by the pressure from the pump 10, controlled as to its maximum value by relief valve 74, does not complete its travel upon initial application of pressure thereto, but merely loads spring 85 to the extent permitted by spacer 94, it being assumed that the engagement between gear 17 and hub gear 23 is sufficient so that without torque interruption, shifting gear 17 is not possible with a spring of the strength used for spring 85 in conjunction with the hydraulic shifting pressure. However, upon torque interruption permitting the engaged gears to disengage sleeve housing 83 and attached shifting fork 15 to move to the left, the piston 13 is permitted to complete its travel to the left, maintaining during a considerable further portion of its travel, pressure on spring 85. The final portion of the shifting movement of fork 15, after piston 13 has completed its travel, is effected by the spring assembly 14.

Conversely, when the shiftable gear 17 is in engagement with hub gear 24 of driving gear 20, that is, is in the reverse position from that illustrated in Fig. 1, then movement of the piston 13 to the right causes ring 86 to compress spring 85, thus loading the spring assembly 14 for moving shifting fork 15 and gear 17 to the right. To move piston 13 to the right, pressure is supplied to the left end of chamber 57 from supply passage 50, through axially extending passage 67 in the hollow shuttle valve 52, the notches 66, the pressure chamber 68, thence through the downwardly extending passage 56 to annular passage 100 formed in the periphery of cylinder block 46, to the left of annular passage 72. Oppositely extending, radial passages 101 connect at their inner ends to chamber 57 and at their outer ends to annular passage 100. Fluid in the right end of chamber 57 is then exhausted through port 60, the open center of valve 52 and exhaust ports 71 and 73. The loading of the spring 85 and interrupted shifting movement of piston 13 is similar to its operation in shifting to the left as just described. In either the extreme right or left position of piston 13, that is, at the completion of a stroke, the inner ends of a pair of short, radially extending exhaust ports 103 formed in piston block 46 and connecting at their outer ends with annular exhaust passage 72, communicate with the piston chamber 57. However, when the piston has traveled its initial movement in either direction, then ports 103 are closed by the piston.

The operation of solenoid 53 is controlled by a switch 104 connected in series with a source of electrical energy such as a battery 105. The use of the solenoid permits location of the control switch at any convenient place such, for example, as the dashboard of the vehicle for manual operation or at a point on the floorboard where the switch is to be foot operated.

Sealing rings 102 are disposed about the periphery of cylinder block 46, being interposed between the periphery of the block and the inner wall of cylinder chamber 57 to prevent leakage between annular passages 100, 72, 95 and 45, as well as to prevent leakage to the left from passage 100 or to the right from passage 45.

The operation of this transmission will be more readily understood in the light of the foregoing description by reference to Figs. 2 through 7 which show a complete sequence of operation of the transmission. It should be borne in mind, of course, that since the gear pump 10 is driven from the rear axle, no shift is made unless the vehicle is moving. That is to say, that the gears will be at the start position in the position or relation which they were in when the vehicle was last stopped.

Figure 2:
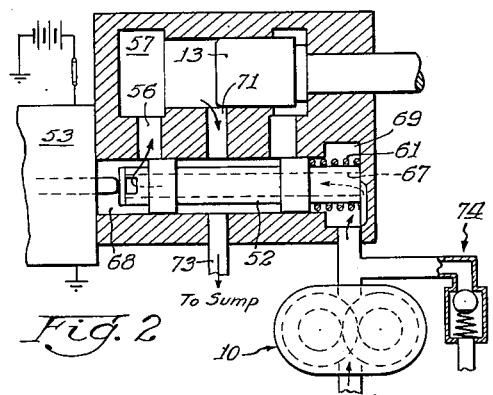
Figs. 2 through 7 are schematic views showing the six phases of operation of the power unit.

Referring first to Fig. 2, this shows the position of the shuttle valve with the solenoid energized, the shuttle valve being located at the extreme right position against the compression of spring 61. The piston 13 has completed its travel to the right, and the shift of the gears has been completed. Oil flows from the pump through the center passage 67 of the shuttle valve, chamber 68, then through the downwardly extending passage 56 into the left end of piston chamber 57. The piston 13 being in its extreme right position, exhaust ports 103 are uncovered, permitting oil to return to the sump through the return passage 73.

Figure 3:
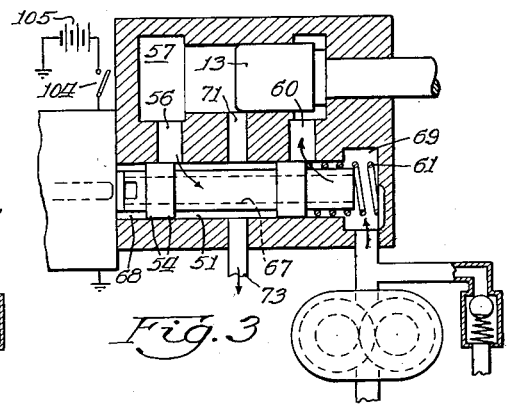

In Fig. 3, in which the position of the parts corresponds to Fig. 1, the shuttle valve has been returned to left position by spring 61, the solenoid having been deenergized by opening control switch 104 and thus removing battery 105 from the circuit. Return flow of oil to the reservoir from the center passage 67 is now blocked since chamber 68 at the left end of the shuttle valve is closed, the flanges 54 having moved to the left of aperture or passage 56. Pressure is applied to the right side of piston 13 from passage 60 connecting to chamber 69. Return flow of oil to the reservoir from the left portion of chamber 57 is permitted through passage 56, the open center of spool valve chamber 51, the downwardly extending passage 71 and sump line 73.

Figure 4:
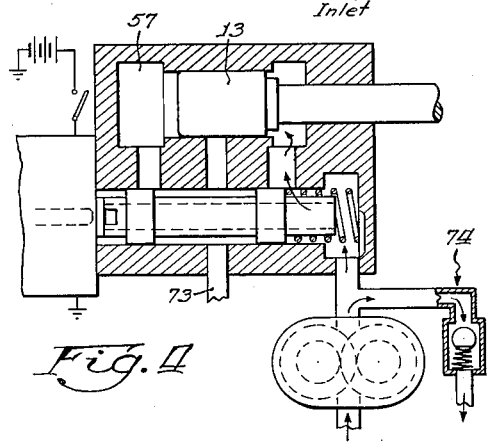

Referring now to Fig. 4, this shows the shifting piston having moved its initial travel to the left under the force of hydraulic pressure, thus loading spring assembly 14. Spacer sleeve 94, as hereinbefore explained, prevents the piston from moving its full distance, in conjunction with the locking provided by the driving engagement between the gears. Pressure is maintained in the right end of chamber 57 and excess pump flow is spilled through the release valve 74 and returned to the pump. The power unit is prepared for shifting upon torque interruption.

Figure 5:
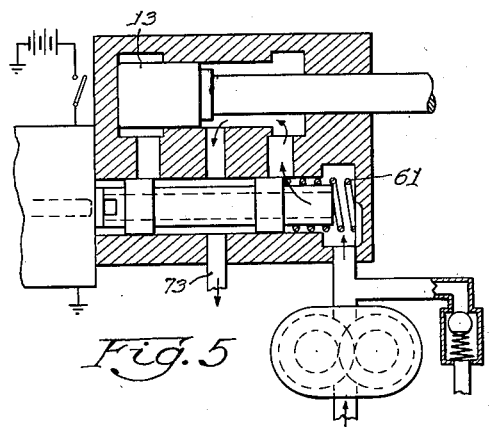
Figure 6:
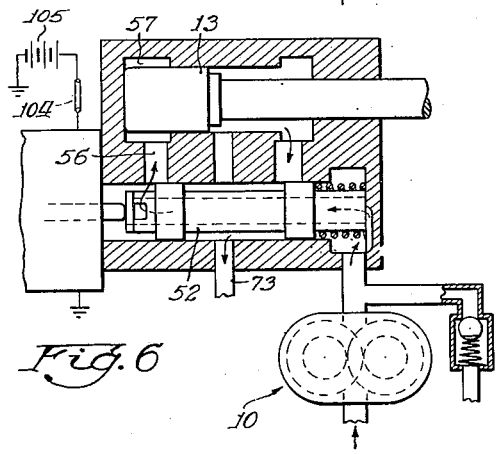

Fig. 5 shows the shifting piston 13 at its extreme left position, the piston having completed its stroke. Oil is returned to the sump through radial passages 103 connecting to annular passage 72 and sump line 73.

In Fig. 6 the solenoid has again been energized by closing switch 104 thereby forcing shuttle valve 52 to the extreme right position for moving shifting piston 13 to the right. The flow of oil from the pump to the reservoir or sump is blocked by the piston 13, while the right side of chamber 57 is connected to the sump, thus preventing a hydraulic block upon movement of the piston to the right.

Figure 7:
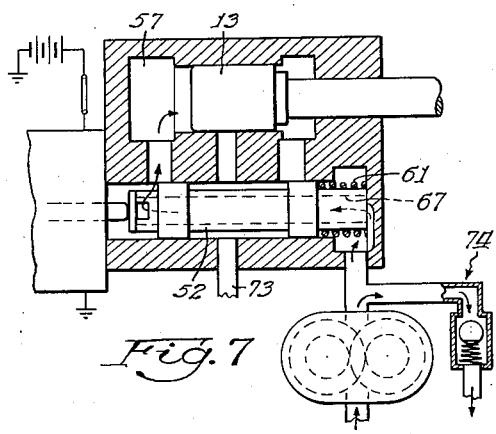

In Fig. 7, the shifting piston has moved to the right its initial travel, thus loading spring motor 14 and preparing it to disengage the shifting gear 17 from hub gear 24 and to engage shifting gear 17 with hub gear 23 upon torque interruption occurring. Excess pump flow is spilled through the relief valve 74. Upon torque interruption, the shift of the piston to the right is completed, and the position of the parts is then that shown in Fig. 2.

In practice it has been that this transmission power unit is very efficient, simple, and because of the use of hydraulic power instead of vacuum, may be made extremely compact and yet be capable of handling heavy axle transmissions.

Where herein the various parts of this invention have been referred to as being located in a right or a left position, it will be understood that this is done solely for the purpose of facilitating description and that such references relate only to the relative positions of the parts as shown in the accompanying drawings.

While but one embodiment of this invention has been shown and described, it will be understood that many changes and modifications may

What is claimed is:

1. In a transmission comprising a pair of gears rotatably supported in spaced relation on a shaft and shiftable clutch means splined to said shaft and engageable with one of said gears to establish one speed ratio in said transmission and, when shifted, engageable with the other of said gears to establish a different speed ratio in said transmission, means for shifting said shiftable clutch means from engagement with one of said gears to engagement with the other of said gears and vice versa, including a spring motor, a piston for loading said spring motor including a hydraulic pressure actuated piston, a pump arranged to supply hydraulic pressure to said piston upon rotation of said shaft, a control valve interposed between said pump and said piston and controlling application of hydraulic pressure from said pump to said piston, said spring motor being connected to said shiftable clutch means and adapted to urge said shiftable clutch means from one engaged relation to the other upon the loading thereof, and means including initial travel limiting means and a relief valve associated with said pump for limiting the initial travel of said piston to an amount sufficient to load said spring motor to a predetermined compression value insufficient to cause complete shifting of said shiftable clutch means from one engaged relation to the other engaged relation until the torque interruption occurs in said transmission, said initial travel limiting means being moved when torque interruption occurs and allowing the combination of hydraulic and spring pressure to complete shifting of said clutch means over a substantial portion of said shifting, the final shifting being accomplished by said spring motor and causing unloading thereof, said control valve comprising a spool valve actuatable by a solenoid, conduit defining means being connected to said control valve and to both sides of said piston so that hydraulic pressure may be applied to either side of said piston to move said piston in either direction as desired.

2. A transmission adapted for driving association with at least one of the road wheels of a vehicle and including a pair of gears rotatably supported in spaced relation on a shaft connected with at least one road wheel, a shiftable clutch means connected to said shaft and engageable with one of said gears to establish one speed ratio in said transmission and, when shifted, engageable with the other of said pair of gears to establish a different speed ratio in said transmission, and means for shifting said shiftable clutch means from engagement with one of said gears to engagement with the other of said gears, comprising a pressure actuated piston having an elongated piston shaft associated therewith, said piston being hydraulically operable in either direction, a first sleeve-like member arranged substantially concentrically with the piston shaft and yieldably connected to said piston shaft so as to be reciprocated thereby upon axial shifting movement of said piston shaft in either direction, means connecting said sleeve-like member to said shiftable clutch means, a spring interposed between said sleeve-like member and said piston shaft for providing said yieldable connection, means cooperating with said piston shaft and said sleeve-like member for limiting relative motion therebetween, means including a second sleeve-like member cooperating with said spring and said shaft to limit the stroke of said piston in either direction and provide maximum compression of said spring, a pump arranged to supply hydraulic pressure to said piston in response to rotation of at least one of the road wheels of said vehicle, a relief valve associated with said pump for limiting the maximum hydraulic pressure applied by said pump to said piston, movement of said shiftable clutch means effecting movement of said first sleeve-like member, the latter allowing movement of said second sleeve-like member to permit the piston to complete its stroke under hydraulic pressure and aid said spring during a substantial portion of its shifting operation, and a control valve for controlling the application of hydraulic pressure by said pump to said piston, said control valve comprising a solenoid actuated spool-type valve operable to permit hydraulic pressure to be applied to either side of said piston as desired.

3. A transmission according to the preceding claim wherein said shiftable clutch means is normally releasable from either engaged relation only under substantially no load condition, said relief valve being selected to limit the hydraulic pressure applied by said pump to an amount insufficient to cause release of said shiftable clutch means except under substantially no load conditions.

JOHN A. KANUCH.

References Cited in the file of this patent

UNITED STATES PATENTS

| Number | Name | Date |
|---|---|---|
| 2,348,763 | Syrovy et al. | May 16, 1944 |
| 2,398,407 | Brownyer | Apr. 16, 1946 |
| 2,402,343 | Price | June 18, 1946 |
| 2,480,801 | Wilson et al. | Aug. 30, 1949 |